(12) United States Patent
Boukouvalas et al.

(10) Patent No.: US 7,167,848 B2
(45) Date of Patent: Jan. 23, 2007

(54) GENERATING A HIERARCHICAL PLAIN-TEXT EXECUTION PLAN FROM A DATABASE QUERY

(75) Inventors: Alexios Boukouvalas, Seattle, WA (US); Lubor J. Kollar, Redmond, WA (US); Jinghao Liu, Redmond, WA (US); Arunprasad P. Marathe, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 498 days.

(21) Appl. No.: 10/704,480

(22) Filed: Nov. 7, 2003

(65) Prior Publication Data

US 2005/0102613 A1   May 12, 2005

(51) Int. Cl.
*G06F 17/00*   (2006.01)
*G06N 5/00*   (2006.01)

(52) U.S. Cl. .................. 706/14; 706/45; 706/46; 707/4

(58) Field of Classification Search ............ 707/4; 706/14, 45, 46
See application file for complete search history.

(56) References Cited

U.S. PATENT DOCUMENTS

| | | | |
|---|---|---|---|
| 6,330,552 B1 * | 12/2001 | Farrar et al. ............... | 705/400 |
| 6,456,997 B1 * | 9/2002 | Shukla ...................... | 707/1 |
| 6,654,734 B1 * | 11/2003 | Mani et al. ................ | 707/2 |
| 6,725,212 B2 * | 4/2004 | Couch et al. .............. | 707/2 |
| 6,785,673 B1 * | 8/2004 | Fernandez et al. ......... | 707/3 |
| 6,865,567 B1 * | 3/2005 | Oommen et al. ........... | 707/2 |
| 2002/0188600 A1 * | 12/2002 | Lindsay et al. ............ | 707/3 |
| 2005/0138047 A1 * | 6/2005 | Liu et al. .................. | 707/100 |

OTHER PUBLICATIONS

Arnon Rosenthal, Cesar Galindo-Legaria, "Query graphs, implementing trees, and freely-reorderable outerjoins," 1990, International Conference on Management of Data, pp. 291-299.*

Neven, F. et al., "Automata-and Logic-Based Pattern Languages for Tree-Structured Data", *Semantics in Databases*, Second International Workshop, Jan. 7-12, 2001, 160-178.

* cited by examiner

*Primary Examiner*—Joseph P Hirl
(74) *Attorney, Agent, or Firm*—Woodcock Washburn LLP

(57) ABSTRACT

A system, method and computer-readable medium containing computer-executable instructions for tuning queries is provided. A query processor converts a query into an execution plan in a hierarchical format that conforms to a standardized schema. In one embodiment of the invention, the hierarchical format employed is XML.

19 Claims, 19 Drawing Sheets

```
                                   300
<ShowPlanXML
xmlns='http://schemas.microsoft.com/sqlserver/2003/03/showplan'
Version='0.5' Build='9.00.619'>
<BatchSequence>
<Batch>              302                  304
<Statements>
<StmtSimple StatementText='select count(*) from dbo.lineitem
'
StatementId='1' StatementCompId='1' StatementType='SELECT'>
<QueryPlan CachedPlanSize='17'> 352                        306
<RelOp NodeId='0' PhysicalOp='Compute Scalar'
LogicalOp='Compute Scalar' EstimateRows='1' EstimateIO='0'
EstimateCPU='0' AvgRowSize='11'
EstimatedTotalSubtreeCost='18.6824' Parallel='0'
EstimateRebinds='0' EstimateRewinds='0'>
<OutputList>
<ColumnReference Column='Expr1004'/>
</OutputList>
<ComputeScalar>
<DefinedValues/> 318          308
<RelOp NodeId='1' PhysicalOp='Compute Scalar'
LogicalOp='Compute Scalar' EstimateRows='1'
EstimateIO='0' EstimateCPU='1e-007'
AvgRowSize='11' EstimatedTotalSubtreeCost='18.6824'
Parallel='0' EstimateRebinds='0' EstimateRewinds='0'>
<OutputList>
<ColumnReference Column='Expr1004'/>
</OutputList>
<ComputeScalar>
<DefinedValues>
<DefinedValue>
<ColumnReference Column='Expr1004'/>    320
<ScalarOperator
ScalarString='CONVERT_IMPLICIT(int,[globalagg1006],0)'>
<Convert DataType='int' Style='0' Implicit='1'>
<ScalarOperator>
<Identifier>
<ColumnReference Column='globalagg1006'/>
</Identifier>
</ScalarOperator>
</Convert>
</ScalarOperator>
</DefinedValue>
</DefinedValues>              310
<RelOp NodeId='2' PhysicalOp='Stream Aggregate'
LogicalOp='Aggregate' EstimateRows='1' EstimateIO='0'
EstimateCPU='2e-007' AvgRowSize='15'
EstimatedTotalSubtreeCost='18.6824' Parallel='0'
EstimateRebinds='0' EstimateRewinds='0'>
<OutputList>
<ColumnReference Column='globalagg1006'/>
</OutputList>
<StreamAggregate>
<DefinedValues>
<DefinedValue>
<ColumnReference
Column='globalagg1006'/>
```

FIG. 3a

```xml
<ScalarOperator ScalarString='SUM([partialagg1005])'>
<Aggregate Distinct='0' AggType='SUM'>
<ScalarOperator>
<Identifier>
<ColumnReference Column='partialagg1005'/>
</Identifier>
</ScalarOperator>
</Aggregate>
</ScalarOperator>
</DefinedValue>
</DefinedValues>
```
— 312
```xml
<RelOp NodeId='3' PhysicalOp='Parallelism' LogicalOp='Gather Streams'
EstimateRows='2' EstimateIO='0' EstimateCPU='0.0285021' AvgRowSize='15'
EstimatedTotalSubtreeCost='18.6824' Parallel='1' EstimateRebinds='0'
EstimateRewinds='0'><OutputList><ColumnReference Column='partialagg1005'/>
</OutputList>
<Parallelism>
```
— 314
```xml
<RelOp NodeId='4' PhysicalOp='Stream Aggregate'
LogicalOp='Aggregate' EstimateRows='2' EstimateIO='0'
EstimateCPU='0.300061' AvgRowSize='15' EstimatedTotalSubtreeCost='18.6539'
Parallel='1' EstimateRebinds='0' EstimateRewinds='0'>
<OutputList>
<ColumnReference Column='partialagg1005'/>
</OutputList>
<StreamAggregate>
<DefinedValues>
<DefinedValue>
<ColumnReference Column='partialagg1005'/>
<ScalarOperator ScalarString='Count(*)'>
<Aggregate AggType='countstar' Distinct='0'/>
</ScalarOperator>
</DefinedValue>
</DefinedValues>
```
— 316
```xml
<RelOp NodeId='5' PhysicalOp='Index Scan' LogicalOp='Index Scan'
EstimateRows='6.00122e+006' EstimateIO='15.0531' EstimateCPU='3.30071'
AvgRowSize='4' EstimatedTotalSubtreeCost='18.3538' Parallel='1'
EstimateRebinds='0' EstimateRewinds='0'>
<OutputList/>
<IndexScan Ordered='0' ForcedIndex='0'>
<DefinedValues/>
<Object Database='tpch1g' Schema='dbo' Table='LINEITEM'
Index='L_ORDERKEY_IDX'/>
</IndexScan>
</RelOp>
</StreamAggregate>
</RelOp>
</Parallelism>
</RelOp>
</StreamAggregate>
</RelOp>
</ComputeScalar>
</RelOp>
</ComputeScalar>
</RelOp>
</QueryPlan>
</StmtSimple>
</Statements>
</Batch>
```

FIG. 3b

```
                          </
                          BatchSequence>
                          </ShowPlanXML
```

FIG. 3c

```
<ShowPlanXML
    xmlns='http://schemas.microsoft.com/sqlserver/2003/03/showplan'
    Version='0.5' Build='9.00.671'>
  <BatchSequence>
   <Batch>
    <Statements>
     <StmtSimple StatementText='exec dbo.byroyalty @percentage = 25'
          StatementId='1' StatementCompId='1' StatementType='EXECUTE'>
        <StoredProc ProcName='dbo.byroyalty'>
          <Statements>
           <StmtSimple StatementText='CREATE PROCEDURE byroyalty @percentage
int AS select au_id from titleauthor where titleauthor.royaltyper = @percentage
                                   .
                                   .
                                   .
<ParameterList>                              351
        <ColumnReference Column='@percentage'
           ParameterCompiledValue='(25)'/>
        </ParameterList>
                                   .
                                   .
                                   .
```

FIG. 3d

```
                                           400
<ShowPlanXML
xmlns='http://schemas.microsoft.com/sqlserver/2003/03/showplan' Version='0.5'
Build='9.00.619'>
<BatchSequence>
<Batch>
<Statements>
<StmtSimple StatementText='SELECT COUNT(*) FROM [dbo].[lineitem]'
StatementId='1' StatementCompId='1' StatementType='SELECT'

StatementSubTreeCost='18.6824' StatementEstRows='1' StatementOptmLevel='FULL'>
<StatementSetOptions QUOTED_IDENTIFIER='false' ARITHABORT='false'
CONCAT_NULL_YIELDS_NULL='true' ANSI_NULLS='true' ANSI_PADDING='true'
ANSI_WARNINGS='true' NUMERIC_ROUNDABORT='false'/>
<QueryPlan DegreeOfParallelism='2'  ── 421

CachedPlanSize='17'>
<RelOp NodeId='0' PhysicalOp='Compute Scalar' LogicalOp='Compute Scalar'
EstimateRows='1' EstimateIO='0' EstimateCPU='0' AvgRowSize='11'
EstimatedTotalSubtreeCost='18.6824' Parallel='0' EstimateRebinds='0'
EstimateRewinds='0'>
<OutputList>
<ColumnReference Column='Expr1004'/>
</OutputList>

<RunTimeInformation>
<RunTimeCountersPerThread Thread='0'           ── 402
ActualRows='0'
ActualRebinds='0'
ActualRewinds='0'/>
</RunTimeInformation>

<ComputeScalar>                                  ── 450
<DefinedValues/>
<RelOp NodeId='1' PhysicalOp='Compute Scalar' LogicalOp='Compute Scalar'
EstimateRows='1' EstimateIO='0' EstimateCPU='1e-007' AvgRowSize='11'
EstimatedTotalSubtreeCost='18.6824' Parallel='0' EstimateRebinds='0'
EstimateRewinds='0'>
<OutputList>
<ColumnReference Column='Expr1004'/>
</OutputList>

<RunTimeInformation>
<RunTimeCountersPerThread Thread='0'           ── 404
ActualRows='0'
ActualRebinds='0'
ActualRewinds='0'/>
</RunTimeInformation>

<ComputeScalar>
<DefinedValues>
<DefinedValue>
<ColumnReference Column='Expr1004'/>           ── 420
<ScalarOperator ScalarString='CONVERT_IMPLICIT(int,[globalagg1006],0)'>
<Convert DataType='int' Style='0' Implicit='1'>
<ScalarOperator>
<Identifier>
<ColumnReference Column='globalagg1006'/>
```

FIG. 4a

```
</Identifier>
</ScalarOperator>                    421              400 cont.
</Convert>
</ScalarOperator>
</DefinedValue>
</DefinedValues>
<RelOp NodeId='2' PhysicalOp='Stream Aggregate' LogicalOp='Aggregate'
EstimateRows='1' EstimateIO='0' EstimateCPU='2e-007' AvgRowSize='15'
EstimatedTotalSubtreeCost='18.6824' Parallel='0' EstimateRebinds='0'
EstimateRewinds='0'>
<OutputList>
<ColumnReference Column='globalagg1006'/>
</OutputList>

<RunTimeInformation>
<RunTimeCountersPerThread Thread='0'          406
ActualRows='1'
ActualRebinds='1'
ActualRewinds='0'/>
</RunTimeInformation>

<StreamAggregate>
<DefinedValues>
<DefinedValue>
<ColumnReference Column='globalagg1006'/>
<ScalarOperator ScalarString='SUM([partialagg1005])'>       422
<Aggregate Distinct='0' AggType='SUM'>
<ScalarOperator>
<Identifier>
<ColumnReference Column='partialagg1005'/>
</Identifier>
</ScalarOperator>                    423
</Aggregate>
</ScalarOperator>
</DefinedValue>
</DefinedValues>
<RelOp NodeId='3' PhysicalOp='Parallelism' LogicalOp='Gather Streams'
EstimateRows='2' EstimateIO='0' EstimateCPU='0.0285021' AvgRowSize='15'
EstimatedTotalSubtreeCost='18.6824' Parallel='1' EstimateRebinds='0'
EstimateRewinds='0'>
<OutputList>
<ColumnReference Column='partialagg1005'/>
</OutputList>

<RunTimeInformation>
<RunTimeCountersPerThread Thread='0'          408
ActualRows='2'
ActualRebinds='1'
ActualRewinds='0'/>
</RunTimeInformation OutputList>
<ColumnReference Column='partialagg1005'/>
</OutputList>
<RunTimeInformation>                          410(continued on
<RunTimeCountersPerThread Thread='1'               FIG. 4c)
```

FIG. 4b

```
ActualRows='1'
ActualRebinds='1'
ActualRewinds='0'/>
<RunTimeCountersPerThread Thread='2'
ActualRows='1'
ActualRebinds='1'
ActualRewinds='0'/>
<RunTimeCountersPerThread Thread='0'
ActualRows='0'
ActualRebinds='0'
ActualRewinds='0'/>
</RunTimeInformation>
```

400 cont.

410 continued

```
<StreamAggregate>
<DefinedValues>
<DefinedValue>
<ColumnReference Column='partialagg1005'/>
<ScalarOperator ScalarString='Count(*)'>
<Aggregate AggType='countstar' Distinct='0'/>
</ScalarOperator>
</DefinedValue>
</DefinedValues>
<RelOp NodeId='5' PhysicalOp='Index Scan' LogicalOp='Index Scan'
EstimateRows='6.00122e+006' EstimateIO='15.0531' EstimateCPU='3.30071'
AvgRowSize='4' EstimatedTotalSubtreeCost='18.3538' Parallel='1'
EstimateRebinds='0' EstimateRewinds='0'>
<OutputList/>
```

```
<RunTimeInformation>
<RunTimeCountersPerThread Thread='1'
ActualRows='2886876'
ActualRebinds='1'
ActualRewinds='0'/>
<RunTimeCountersPerThread Thread='2'
ActualRows='3114339'
ActualRebinds='1'
ActualRewinds='0'/>
<RunTimeCountersPerThread Thread='0'
ActualRows='0'
ActualRebinds='0'
ActualRewinds='0'/>
</RunTimeInformation>
```

414  416  412

```
<IndexScan Ordered='0' ForcedIndex='0'>
<DefinedValues/>
<Object Database='tpch1g' Schema='dbo' Table='LINEITEM'
Index='L_ORDERKEY_IDX'/>
</IndexScan>
</RelOp>
</StreamAggregate>
</RelOp>
</Parallelism>
</RelOp>
</StreamAggregate>
</RelOp>
</ComputeScalar>
</RelOp>
/ComputeScalar>
```

```
</RelOp>
</QueryPlan>
</StmtSimple>
</Statements>
</Batch>
</BatchSequence>
</ShowPlanXML
```

FIG. 4d

XML Schema 500

```
<?xml version="1.0" encoding="utf-8"?>
<xsd:schema targetNamespace="http://schemas.microsoft.com/sqlserver/2003/03/
showplan" xmlns:shp="http://schemas.microsoft.com/sqlserver/2003/03/showplan"
xmlns:xsd="http://www.w3.org/2001/XMLSchema" elementFormDefault="qualified"
attributeFormDefault="unqualified" version="0.5" blockDefault="#all">
      <xsd:annotation>
            <xsd:documentation>Last updated: 04/21/03</xsd:documentation>
      </xsd:annotation>
      <xsd:element name="ShowPlanXML">
            <xsd:complexType>
                  <xsd:annotation>
                        <xsd:documentation>This is the root element</xsd:documentation>
                  </xsd:annotation>
                  <xsd:sequence>
                        <xsd:element name="BatchSequence">
                              <xsd:complexType>
                                    <xsd:sequence>
                                          <xsd:element name="Batch" maxOccurs="unbounded">
                                                <xsd:complexType>
                                                      <xsd:sequence>
                                                            <xsd:element name="Statements" type="shp:StmtBlockType" maxOccurs="unbounded"/>
                                                      </xsd:sequence>
                                                </xsd:complexType>
                                          </xsd:element>
                                    </xsd:sequence>
                              </xsd:complexType>
                        </xsd:element>
                  </xsd:sequence>
                  <xsd:attribute name="Version" type="xsd:string" use="required"/>
            </xsd:complexType>
      </xsd:element>
      <xsd:complexType name="StmtBlockType">
            <xsd:annotation>
                  <xsd:documentation>The statement block that contains many statements</xsd:documentation>
            </xsd:annotation>
            <xsd:sequence>
                  <xsd:choice minOccurs="0" maxOccurs="unbounded">           ─504
                        <xsd:element name=|StmtSimple|
type="shp:StmtSimpleType" />                    ─506
                        <xsd:element name=|StmtCond|
type="shp:StmtCondType" />                      ─508
                        <xsd:element name=|StmtCursor|
type="shp:StmtCursorType" />                    ─510
                        <xsd:element name=|StmtReceive|
type="shp:StmtReceiveType" />
                  </xsd:choice>
            </xsd:sequence>
      </xsd:complexType>
```

FIG. 5a

```
<xsd:complexType name="RunTimeInformationType">
        <xsd:annotation>
                <xsd:documentation>Runtime information provided from
statistics_xml for each relational iterator</xsd:documentation>
        </xsd:annotation>
        <xsd:sequence>
                <xsd:element name="RunTimeCountersPerThread"
maxOccurs="unbounded">
                        <xsd:complexType>
                                <xsd:sequence/>
                                <xsd:attribute name="Thread" type="xsd:int"
use="required"/>
                                <xsd:attribute name="ActualRebinds"
type="xsd:int" use="required"/>
                                <xsd:attribute name="ActualRewinds"
type="xsd:int" use="required"/>
                                <xsd:attribute name="ActualRows" type="xsd:int"
use="required"/>
                        </xsd:complexType>
                </xsd:element>
        </xsd:sequence>
</xsd:complexType>
    <!--
*******************************************
**
**  Relational Operator related definitions
**
**
**
*******************************************
-->
    <!-- Base class execution tree element -->
    <xsd:complexType name="QueryPlanType">
        <xsd:annotation>
                <xsd:documentation>
                New Runtime information:
                DegreeOfParallelism
                MemoryGrant (in kilobytes)

New compile time information:
                mem fractions
                CachedPlanSize (in kilobytes)
                Parameter values used during query compilation
                </xsd:documentation>
        </xsd:annotation>
        <xsd:sequence>
                <xsd:element name="RelOp" type="shp:RelOpType"/>
                <xsd:element name="ParameterList"
type="shp:ColumnReferenceListType" minOccurs="0"/>
        </xsd:sequence>
        <xsd:attribute name="DegreeOfParallelism" type="xsd:int"
use="optional"/>                                                    520
        <xsd:attribute name="MemoryGrant" type="xsd:unsignedLong"
use="optional"/>
        <xsd:attribute name="CachedPlanSize" type="xsd:unsignedLong"
use="optional"/>
    </xsd:complexType>
                                                                    522
```

FIG. 5b

```
<xsd:element name="RemoteQuery" type="shp:RemoteQueryType"/>
            <xsd:element name="RemoteRange"
type="shp:RemoteType"/>
            <xsd:element name="RemoteScan"
type="shp:RemoteType"/>
            <xsd:element name="RowCountSpool"
type="shp:SimpleIteratorOneChildType"/>
            <xsd:element name="ScalarInsert"
type="shp:ScalarInsertType"/>
            <xsd:element name="Segment" type="shp:SegmentType"/>
            <xsd:element name="Sequence"
type="shp:SequenceType"/>
            <xsd:element name="SequenceProject"
type="shp:ComputeScalarType"/>
            <xsd:element name="SimpleUpdate"
type="shp:SimpleUpdateType"/>
            <xsd:element name="Sort" type="shp:SortType"/>
            <xsd:element name="Split" type="shp:SplitType"/>
            <xsd:element name="Spool" type="shp:SpoolType"/>
            <xsd:element name="StreamAggregate"
type="shp:StreamAggregateType"/>
            <xsd:element name="Switch" type="shp:ConcatType"/>
            <xsd:element name="TableScan"
type="shp:TableScanType"/>
            <xsd:element name="TableValuedFunction"
type="shp:TableValuedFunctionType"/>
            <xsd:element name="Top" type="shp:TopType"/>
            <xsd:element name="TopSort" type="shp:TopSortType"/>
            <xsd:element name="Update" type="shp:UpdateType"/>
        </xsd:choice>
    </xsd:sequence>
    <xsd:attribute name="AvgRowSize" type="xsd:float"
use="required"/>
    <xsd:attribute name="EstimateCPU" type="xsd:float"           ─ 580
use="required"/>
    <xsd:attribute name="EstimateIO" type="xsd:float"            ─ 581
use="required"/>
    <xsd:attribute name="EstimateRebinds" type="xsd:float"       ─ 582
use="required"/>
    <xsd:attribute name="EstimateRewinds" type="xsd:float"       ─ 583
use="required"/>
    <xsd:attribute name="EstimateRows" type="xsd:float"          ─ 584
use="required"/>
    <xsd:attribute name="LogicalOp" type="shp:LogicalOpType"
use="required"/>
    <xsd:attribute name="NodeId" type="xsd:int" use="required"/>
    <xsd:attribute name="Parallel" type="xsd:boolean"
use="required"/>
```

FIG. 5c

```
</xsd:extension>
        </xsd:complexContent>
    </xsd:complexType>
    <xsd:complexType name="TableValuedFunctionType">
        <xsd:complexContent>
            <xsd:extension base="shp:RowsetType">
                <xsd:sequence>
                    <xsd:element name="ParameterList"
type="shp:ScalarExpressionListType" minOccurs="0"/>
                </xsd:sequence>
            </xsd:extension>
        </xsd:complexContent>
    </xsd:complexType>                      ┌─ 585
    <xsd:complexType name="HashType">
        <xsd:complexContent>
            <xsd:extension base="shp:RelOpBaseType">
                <xsd:sequence>
                    <xsd:element name="HashKeysBuild"
type="shp:ColumnReferenceListType"/>
                    <xsd:element name="HashKeysProbe"
type="shp:ColumnReferenceListType" minOccurs="0"/>
                    <xsd:element name="BuildResidual"
type="shp:ScalarExpressionType" minOccurs="0"/>
                    <xsd:element name="ProbeResidual"
type="shp:ScalarExpressionType" minOccurs="0"/>
                    <xsd:element name="RelOp" type="shp:RelOpType"
maxOccurs="2"/>
                </xsd:sequence>
            </xsd:extension>
        </xsd:complexContent>
    </xsd:complexType>
    <xsd:complexType name="ComputeScalarType">
        <xsd:complexContent>
            <xsd:extension base="shp:RelOpBaseType">
                <xsd:sequence>
                    <xsd:element name="RelOp" type="shp:RelOpType"/>
                </xsd:sequence>
            </xsd:extension>
        </xsd:complexContent>
    </xsd:complexType>
    <xsd:complexType name="ParallelismType">
        <xsd:complexContent>
            <xsd:extension base="shp:RelOpBaseType">
                <xsd:sequence>
                    <xsd:element name="PartitionColumns"
type="shp:ColumnReferenceListType" minOccurs="0"/>
                    <xsd:element name="OrderBy" type="shp:OrderByType"
minOccurs="0"/>
                    <xsd:element name="HashKeys"
type="shp:ColumnReferenceListType" minOccurs="0"/>
                    <xsd:element name="ProbeColumn"
type="shp:SingleColumnReferenceType" minOccurs="0"/>
                    <xsd:element name="RelOp" type="shp:RelOpType"/>
                </xsd:sequence>
```

FIG. 5d

```
<xsd:enumeration value="AND"/>
            <xsd:enumeration value="IMPLIES"/>
            <xsd:enumeration value="IS NOT NULL"/>
            <xsd:enumeration value="IS NULL"/>
            <xsd:enumeration value="IS"/>
            <xsd:enumeration value="IsFalseOrNull"/>
            <xsd:enumeration value="NOT"/>
            <xsd:enumeration value="OR"/>
            <xsd:enumeration value="XOR"/>
        </xsd:restriction>
    </xsd:simpleType>
    <xsd:simpleType name="LogicalOpType">
        <xsd:annotation>
            <xsd:documentation>
                These are the logical operators to which "query"
                    portions of T-SQL statement are translated. Subsequent
                    to that translation, a physical operator is chosen for
                    evaluating each logical operator. The SQL Server query
                    optimizer uses a cost-based approach to decide which
                    physical operator will implement a logical operator.
            </xsd:documentation>
        </xsd:annotation>
        <xsd:restriction base="xsd:string">
            <xsd:enumeration value="Aggregate"/>
            <xsd:enumeration value="Anti Diff"/>
            <xsd:enumeration value="Assert"/>
            <xsd:enumeration value="Bitmap Create"/>
            <xsd:enumeration value="Branch Repartition"/>
            <xsd:enumeration value="Broadcast"/>
            <xsd:enumeration value="Cache"/>
            <xsd:enumeration value="Clustered Index Scan"/>
            <xsd:enumeration value="Clustered Index Seek"/>
            <xsd:enumeration value="Clustered Update"/>
            <xsd:enumeration value="Collapse"/>
            <xsd:enumeration value="Compute Scalar"/>
            <xsd:enumeration value="Concatenation"/>
            <xsd:enumeration value="Constant Scan"/>
            <xsd:enumeration value="Cross Join"/>
            <xsd:enumeration value="Delay"/>
            <xsd:enumeration value="Delete"/>
            <xsd:enumeration value="Deleted Scan"/>
            <xsd:enumeration value="Distinct Sort"/>
            <xsd:enumeration value="Distinct"/>
            <xsd:enumeration value="Distribute Streams"/>
            <xsd:enumeration value="Eager Spool"/>
            <xsd:enumeration value="Filter"/>
            <xsd:enumeration value="Flow Distinct"/>
            <xsd:enumeration value="Full Outer Join"/>
            <xsd:enumeration value="Gather Streams"/>
            <xsd:enumeration value="Index Scan"/>
            <xsd:enumeration value="Index Seek"/>
            <xsd:enumeration value="Inner Join"/>
```

FIG. 5e

```
<xsd:enumeration value="Insert"/>
    <xsd:enumeration value="Inserted Scan"/>
    <xsd:enumeration value="Intersect All"/>
    <xsd:enumeration value="Intersect"/>
    <xsd:enumeration value="Lazy Spool"/>
    <xsd:enumeration value="Left Anti Sem iJoin    "/>
    <xsd:enumeration value="Left Diff All"/>
    <xsd:enumeration value="Left Diff"/>
    <xsd:enumeration value="Left Outer Join"/>
    <xsd:enumeration value="Left Semi Join"/>
    <xsd:enumeration value="LogRowScan"/>
    <xsd:enumeration value="Merge Interval"/>
    <xsd:enumeration value="Multiple Index Scan"/>
    <xsd:enumeration value="Parameter Table Scan"/>
    <xsd:enumeration value="Partial Aggregate"/>
    <xsd:enumeration value="Print"/>
    <xsd:enumeration value="Rank"/>
    <xsd:enumeration value="Remote Delete"/>
    <xsd:enumeration value="Remote Insert"/>
    <xsd:enumeration value="Remote Query"/>
    <xsd:enumeration value="Remote Scan"/>
    <xsd:enumeration value="Remote Update"/>
    <xsd:enumeration value="Repartition Streams"/>
    <xsd:enumeration value="RID Lookup"/>
    <xsd:enumeration value="Right Anti Semi Join"/>
    <xsd:enumeration value="Right Diff All"/>
    <xsd:enumeration value="Right Diff"/>
    <xsd:enumeration value="Right Outer Join"/>
    <xsd:enumeration value="Right Semi Join"/>
    <xsd:enumeration value="Segment Repartition"/>
    <xsd:enumeration value="Segment"/>
    <xsd:enumeration value="Sequence"/>
    <xsd:enumeration value="Sort"/>
    <xsd:enumeration value="Split"/>
    <xsd:enumeration value="Switch"/>
    <xsd:enumeration value="Table-valued function"/>
    <xsd:enumeration value="Table Scan"/>
    <xsd:enumeration value="Top"/>
    <xsd:enumeration value="TopN Sort"/>
    <xsd:enumeration value="UDX"/>
    <xsd:enumeration value="Union"/>
    <xsd:enumeration value="Update"/>            586
        </xsd:restriction>
    </xsd:simpleType>
    <xsd:simpleType name="PhysicalOpType">
        <xsd:annotation>
            <xsd:documentation>
                Each of the physical operator is an iterator. An iterator
                can answer three method calls: Init(), GetNext(), and Close().
                Upon receiving an Init() call, an iterator initializes itself,
                setting up any data structures if necessary. Upon receiving a
                GetNext() call, the iterator produces the "next" packet of
                                                                        587
```

FIG. 5f

```
data and gives it to the iterator that made the GetNext() call.
                         To produce the "next" packet of data, the
iterator may have to
                         make zero or more GetNext() (or even Init())
calls to its
                         children. Upon receiving a Close() call, an
iterator performs
                         some clean-up operations and shuts itself down.
Typically, an
                         iterator receives one Init() call, followed by
many GetNext()
                         calls, and then a single Close() call.

The "query" portion of a T-SQL statement is
typically a tree
                         made up of iterators.

Usually, there is a one-to-many mapping among
logical operators
                         and physical operators. That is, usually
multiple physical operators
                         can implement a logical operator. In some cases
in SQL Server,
                         however, a physical operator can implement
multiple logical operators.
            </xsd:documentation>
        </xsd:annotation>
        <xsd:restriction base="xsd:string">
            <xsd:enumeration value="Assert"/>
            <xsd:enumeration value="Bitmap"/>
            <xsd:enumeration value="Clustered Index Delete"/>
            <xsd:enumeration value="Clustered Index Insert"/>
            <xsd:enumeration value="Clustered Index Scan"/>
            <xsd:enumeration value="Clustered Index Seek"/>
            <xsd:enumeration value="Clustered Index Update"/>
            <xsd:enumeration value="Clustered Update"/>
            <xsd:enumeration value="Collapse"/>
            <xsd:enumeration value="Compute Scalar"/>
            <xsd:enumeration value="Concatenation"/>
            <xsd:enumeration value="Constant Scan"/>
            <xsd:enumeration value="Delay"/>
            <xsd:enumeration value="Deleted Scan"/>
            <xsd:enumeration value="Filter"/>
            <xsd:enumeration value="Hash Match"/>
            <xsd:enumeration value="Index Delete"/>
            <xsd:enumeration value="Index Insert"/>
            <xsd:enumeration value="Index Scan"/>
            <xsd:enumeration value="Index Seek"/>
            <xsd:enumeration value="Index Spool"/>
            <xsd:enumeration value="Index Update"/>
            <xsd:enumeration value="Inserted Scan"/>
            <xsd:enumeration value="Log Row Scan"/>
            <xsd:enumeration value="Merge Interval"/>
            <xsd:enumeration value="Merge Join"/>
            <xsd:enumeration value="Multiple Index Scan"/>
            <xsd:enumeration value="Nested Loops"/>
```

FIG. 5g

```xml
<xsd:enumeration value="Parallelism"/>
            <xsd:enumeration value="Parameter Table Scan"/>
            <xsd:enumeration value="Print"/>
            <xsd:enumeration value="Rank"/>
            <xsd:enumeration value="Remote Delete"/>
            <xsd:enumeration value="Remote Insert"/>
            <xsd:enumeration value="Remote Query"/>
            <xsd:enumeration value="Remote Scan"/>
            <xsd:enumeration value="Remote Update"/>
            <xsd:enumeration value="RID Lookup"/>
            <xsd:enumeration value="Row Count Spool"/>
            <xsd:enumeration value="Segment"/>
            <xsd:enumeration value="Sequence"/>
            <xsd:enumeration value="Sort"/>
            <xsd:enumeration value="Split"/>
            <xsd:enumeration value="Stream Aggregate"/>
            <xsd:enumeration value="Switch"/>
            <xsd:enumeration value="Table-valued function"/>
            <xsd:enumeration value="Table Delete"/>
            <xsd:enumeration value="Table Insert"/>
            <xsd:enumeration value="Table Scan"/>
            <xsd:enumeration value="Table Spool"/>
            <xsd:enumeration value="Table Update"/>
            <xsd:enumeration value="Top"/>                    587
            <xsd:enumeration value="UDX"/>
        </xsd:restriction>
    </xsd:simpleType>
    <xsd:complexType name="SetOptionsType">
        <xsd:annotation>
            <xsd:documentation>The set options that affects query cost</xsd:documentation>
        </xsd:annotation>
        <xsd:attribute name="ANSI_NULLS" type="xsd:boolean"/>
        <xsd:attribute name="ANSI_PADDING" type="xsd:boolean"/>
        <xsd:attribute name="ANSI_WARNINGS" type="xsd:boolean"/>
        <xsd:attribute name="ARITHABORT" type="xsd:boolean"/>
        <xsd:attribute name="CONCAT_NULL_YIELDS_NULL" type="xsd:boolean"/>
        <xsd:attribute name="NUMERIC_ROUNDABORT" type="xsd:boolean"/>
        <xsd:attribute name="QUOTED_IDENTIFIER" type="xsd:boolean"/>
    </xsd:complexType>
</xsd:schema>
```

FIG. 5h

```
StmtText          Argument                                                    StmtId  NodeId  Parent  PhysicalOp
LogicalOp                                              DefinedValues                                  EstimateRows
EstimateIO  EstimateCPU  AvgRowSize  TotalSubtreeCost  OutputList  Warnings  Type     Parallel
                                                                  EstimateExecutions
-----------------------------------------------------------------------------------------------------
select count(*) from dbo.lineitem                                                                 NULL  NULL
                                                                                        1  1  0 NULL
       18.682405  NULL         NULL  SELECT                                                NULL
  |--Compute Scalar(DEFINE:([Expr1004]=CONVERT_IMPLICIT(int,[globalagg1006],0)))            1   1   3
Compute Scalar    Compute Scalar          DEFINE:([Expr1004]=CONVERT_IMPLICIT(int,[globalagg1006],0))
[Expr1004]=CONVERT_IMPLICIT(int,[globalagg1006],0)        1   0  0.0000001     11    18.682405
       [Expr1004]              NULL  PLAN_ROW                                                         1
   |--Stream Aggregate(DEFINE:([globalagg1006]=SUM([partialagg1005])))                      1   3 Stream
Aggregate        Aggregate              1                                       NULL              4
[globalagg1006]=SUM([partialagg1005])              0  0.0000002     15   18.682405
       [globalagg1006]         NULL  PLAN_ROW                                       1
       |--Parallelism(Gather Streams)                                                       1  4 Parallelism  Gather
Streams   NULL                                     NULL                         1              5  2       0
   0.02850215     15    18.682404 [partialagg1005] NULL  PLAN_ROW                    1
       |--Stream Aggregate(DEFINE:([partialagg1005]=Count(*)))                              1   5 Stream Aggregate
Aggregate        NULL                                          [partialagg1005]=Count(*)              2
   0   0.30006075  15   18.653902 [partialagg1005] NULL  PLAN_ROW                       1   7    6 Index
         |--Index Scan(OBJECT:([tpch1g].[dbo].[LINEITEM].[L_ORDERKEY_IDX]))                            NULL
Scan              Index Scan               OBJECT:([tpch1g].[dbo].[LINEITEM].[L_ORDERKEY_IDX])         1
6001215   15.053134    3.3007076      4    18.353842 NULL  NULL  PLAN_ROW

1

(6 rows affected)
```

GENERATING A HIERARCHICAL PLAIN-TEXT EXECUTION PLAN FROM A DATABASE QUERY

COMPUTER PROGRAM LISTING APPENDIX

A computer program listing appendix is provided on a compact disc, the material on which is incorporated herein by reference. The compact disc includes a file named PKG23.XSD.TXT, with a size of 57 KB. One duplicate compact disc is also provided.

A portion of the present disclosure is contained in an Appendix containing an XML schema named PKG23.XSD.TXT created Aug. 7, 2006, 57 KB, and is submitted on one compact disk and one duplicate compact disk. The contents of PKG23.XSD.TXT are herein incorporated by reference in its entirety.

The contents of PKG23.XSD.TXT is subject to copyright protection. The copyright owner has no objection to the reproduction of the patent document or the application as it appears in the Patent and Trademark Office files or records, but does not waive any other copyright rights by virtue of the patent application.

FIELD OF THE INVENTION

The invention relates to computing and in particular to generating a hierarchical plain-text execution plan from a database query.

BACKGROUND OF THE INVENTION

A database management system is a suite of programs that manages large structured sets of persistent data. A database management system (DBMS) typicdly controls the organization, storage and retrieval of data, organized in fields, records and files, in a database. The DBMS typically accepts requests for data from users and programs and returns the requested data. A request for data from a DBMS is called a query. Many database systems require a request for information to be made in the form of a stylized query written in a special query language. For example, the query:

SELECT * FROM employees WHERE age>30 AND name="Smith" requests all records in which the name field is "Smith" and the age field has a value greater than 30 and is written in a common query language, SQL (Structured Query Language).

Most query languages are declarative, meaning, the user specifies what data is wanted and a query optimizer decides the best way to access and process the data. For a given database query, there may be many different ways to process a given query correctly. For example, suppose the query is:

---
SELECT name, age, salary
FROM employees
WHERE age > 30 AND city = 'Philadelphia' AND salary < 100,000

---

Even though this query is very simple and references only one table, so no choices of join order or join method are available, there are still many different ways in which correct results could be returned. The DBMS could, for example, scan each row in the table and apply each predicate (each filtering condition in the WHERE clause that is joined by AND is a predicate) or, if appropriate indexes exist, one or more indexes could be exploited to access only the rows satisfying one or more of the predicates. For example, the presence of an index on age could limit access to only those rows satisfying the condition age>30 before applying the other predicates. Alternatively, the presence of an index on city could limit access to only those rows satisfying the condition city='Philadelphia' before applying the predicates age>30 and salary<100,000. If an index on multiple columns, such as a combined index on age and city existed, more options would exist.

For complex queries involving many predicates and/or operations and when there are multiple tables accessed, the number of alternative strategies increases exponentially, making the selection of an optimal query plan an even more daunting task. For a two-table join with a handful of predicates, the optimizer may consider over a hundred different plans; for six tables, the number of plans considered could be well over a thousand.

The most efficient query strategy for the database depends on a number of things including availability of the indexes and characteristics of the data. For example, in the above example, if there were very few people in the database older than 30, using an age index and subsequently applying the filtering conditions, city='Philadelphia' and salary<100,000 might be the most effective strategy because only a few rows would be returned from the first step.

Most query optimizers attempt to determine the best query execution plan by mathematically modeling the estimated execution cost for each of the plans and selecting the one with the lowest estimated cost. Other optimizers apply a system of rules to select a query plan. Because the optimizer makes a number of assumptions that may or may not be true, sometimes the plan the optimizer selects is not the best execution plan. When the query plan is actually executed, the query may take a long time to run. Sometimes a database administrator or other data processing professional will review the execution plan and try to determine a better way to structure the query to make the query run faster. This process, whether performed by human or machine, is often referred to as query tuning.

Some DBMSs provide query tuning tools to help develop more efficient queries. Tools to generate estimated query plans based on database statistics, and actual execution plans based on actually running the query, may be provided. A query analyzer, for example, may provide an estimated or actual graphical query execution plan. A profiler or other query tuning tool may provide estimated and/or actual textual execution plans.

A complex graphical query plan may be divided into a number of parts represented as icons or blocks, listed one on top of another on a screen or printout. Each part may represent a separate process or step that the optimizer had to perform to get to the final results. Each step may be broken down into small sub-steps, with the sub-steps and steps connected by arrows showing the path the query took when it executed. The thickness of the arrows may indicate the relative cost in number of rows and row size of the data moving between the blocks. As may be appreciated, the results may not be easy to read and interpret, by man or machine. Additionally, a graphical query execution plan may be difficult to transport from one machine to another because of size and software compatibility.

Textual query execution plans may be provided, by, for example, selecting particular data elements to be traced. Textual query execution plans, like graphical plans, can be quite difficult to read and understand, especially for a machine or process. An exemplary textual query execution plan for the very simple query SELECT count(*) FROM dbo.lineitem is displayed in FIG. 7(700). As can be readily understood, in order for a textual query execution plan to be read and operated on by a machine or process, the textual plan must be parsed character by character, a not insignificant programming task in itself.

It would be helpful, therefore if a hierarchical, plain-text execution plan could be provided in a standardized output format that would be easy for humans and machines to read, understand and work with.

SUMMARY OF THE INVENTION

A system, method and computer-executable medium containing computer-executable instructions to provide an execution plan in a hierarchical plain-text format is disclosed. The hierarchical plain-text format of the execution plan may conform to a standardized schema. In one embodiment of the invention, the hierarchical format employed is XML.

BRIEF DESCRIPTION OF THE DRAWINGS

The foregoing summary, as well as the following detailed description of illustrative embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIGS. 3*a–c* is an exemplary compile-time execution plan in accordance with one embodiment of the application;

FIG. 3*d* is a second exemplary compile-time execution plan in accordance with one embodiment of the application;

FIGS. 4*a–d* is an exemplary run-time execution plan in accordance with one embodiment of the application;

FIGS. 5*a–h* is a portion an exemplary XML schema for the compile-time execution plan of FIGS. 3*a–c* and 3*d* and the exemplary run-time execution plan of FIGS. 4*a–d;*

FIG. 7 is an exemplary textual execution plan.

DETAILED DESCRIPTION OF ILLUSTRATIVE EMBODIMENTS

Overview

A system, method and computer-readable medium containing computer-executable instructions for providing query execution plans in a hierarchical plain-text format is provided. A query processor, in one embodiment of the invention, converts a query into an execution plan that is presented in a plain-text hierarchical format that conforms to a standardized schema. In one embodiment of the invention, the hierarchical format employed is XML. The use of XML as a format in which to generate the hierarchical plaintext plan has a number of advantages. Because the developer creates his own markup language, he is not restricted to a limited set of tags defined by others and can define a set of rules to accompany use of the tags. Because of XML element tags, their nestings, and the metadata associated with them, hierarchical relationships may be explicitly captured and rich meta-data can be associated with plan tree nodes. The execution plan may include additional data captured at query run-time. Tools that have been developed to use with XML can be used with the execution plan. In one embodiment of the invention, a schema is defined that gives precise meaning to the execution plan. Execution plans may be validated against the schema to minimize the chance of errors. Standards are easily created and users informed thereof by use of an XML schema. For example, use of a schema may simplify the creation and marketing of tools to display and process the execution plan.

Exemplary Computing Environment

Figure 1:
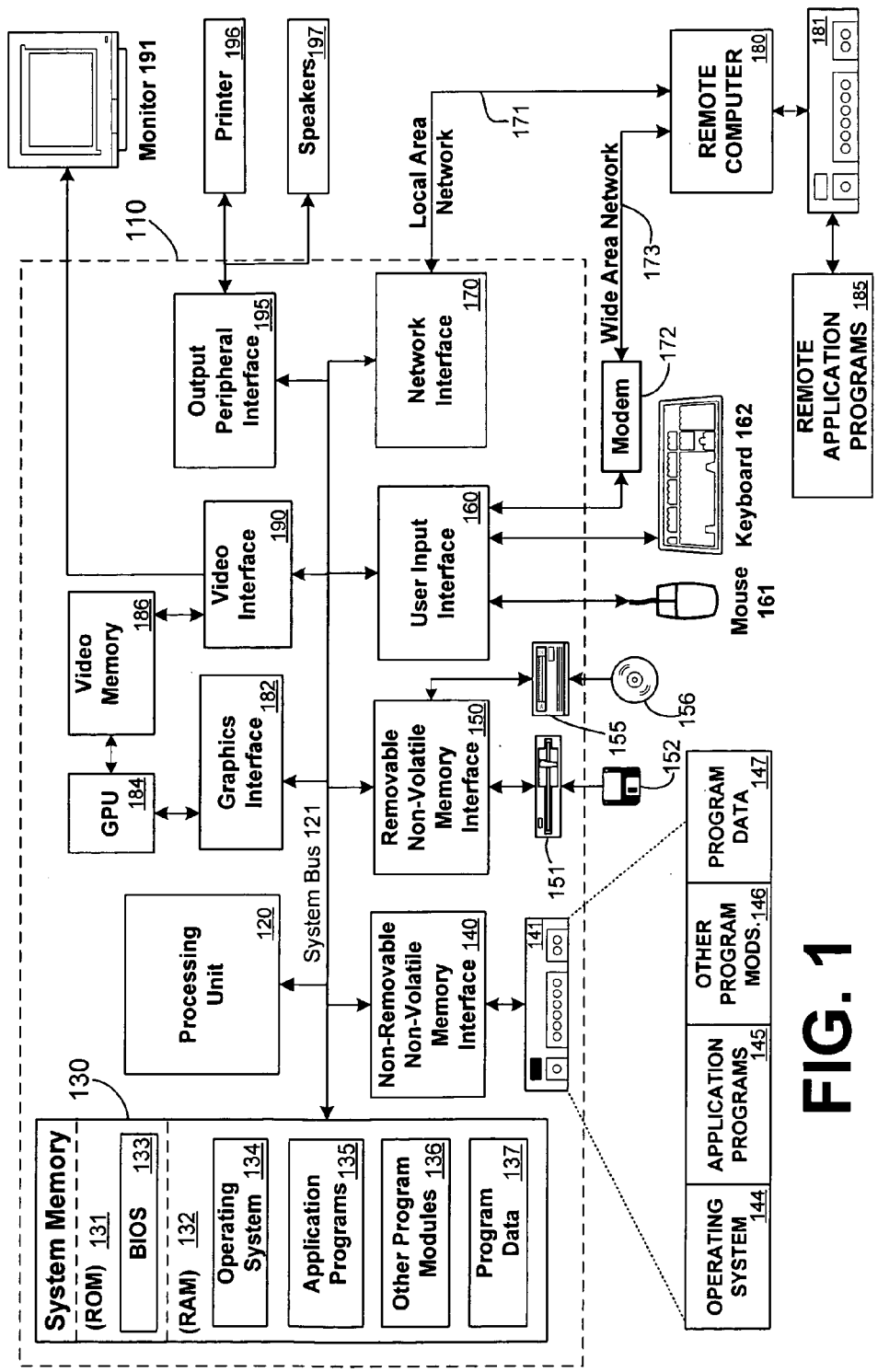
FIG. 1 is a block diagram showing an exemplary computing environment in which aspects of the invention may be implemented.

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, handheld or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUS) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer 110. A monitor 191 or other type of display device is also connected to the system bus 121 via an interface, such a& a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

System and Method for Generating a Hierarchical Plain-Text Execution Plan

Figure 2:
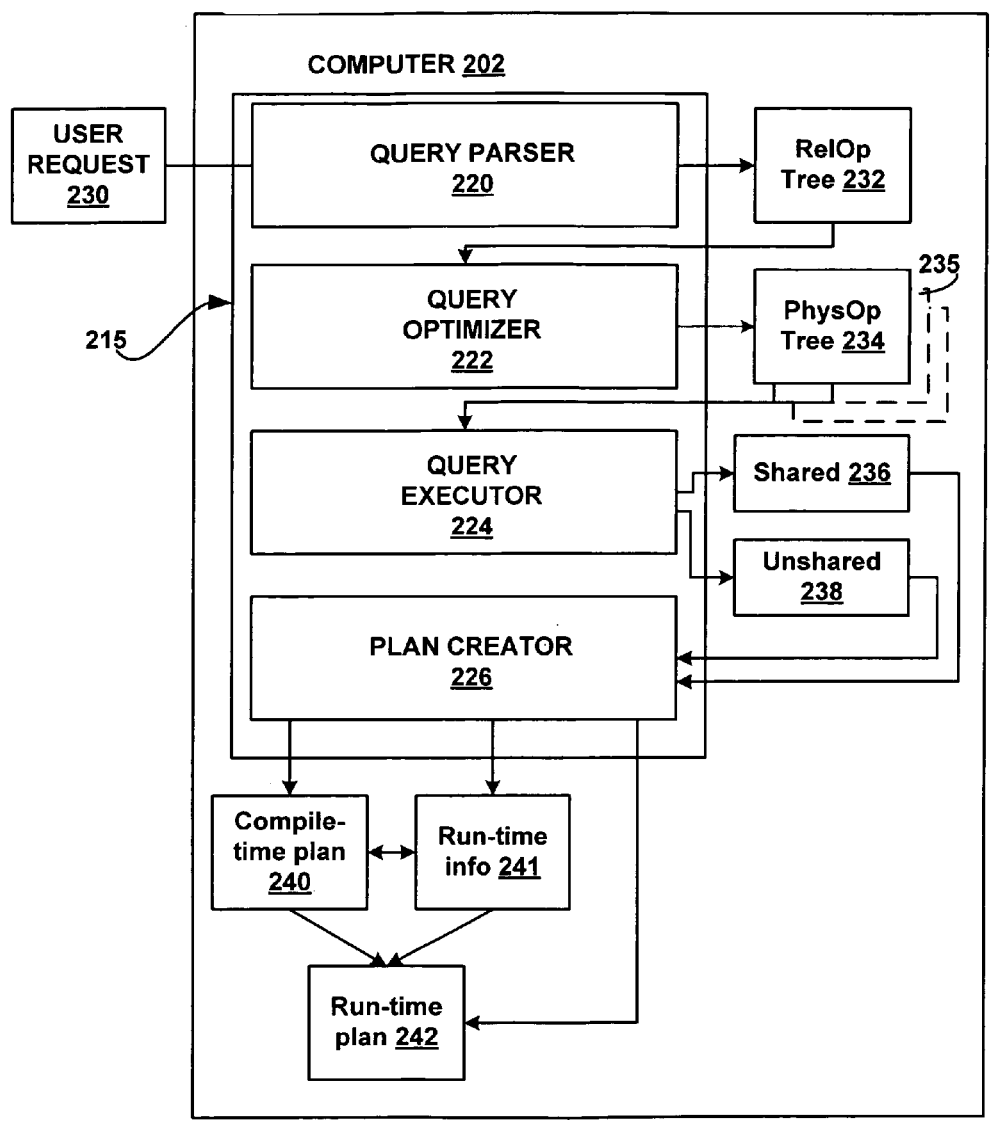
FIG. 2 is a block diagram of a system for generating a plain-text hierarchical execution plan in accordance with one embodiment of the invention.

FIG. 2 depicts an exemplary system for generating a hierarchical plain-text execution plan in accordance with one embodiment of the invention. Referring now to FIG. 2, computer 202 represents a computer such as the one described with respect to FIG. 1, on which the invention may reside. In some embodiments of the invention, the system for generating a hierarchical plain-text execution plan comprises plan creator 226, but plan creator 226 may alternatively be implemented as a part of a query processor. An exemplary query processor 215 may also include one or more of the following: a query parser 220, a query optimizer 222, and a query executor 224. Query parser 220 may receive a user request 230. User request 230 may be provided by a human user or by a program and may be written in a query language such as SQL, QBE (Query By Example), DATALOG or other suitable query language. User request 230 may be a query or a batch (which is a sequence of queries). Query parser 220 may parse user request 230 for syntactical correctness and build an internal relational operator tree representation 232 of the user request.

Query optimizer 222 may receive a relational operator tree such as exemplary relational operator tree 232 and generate one or more physical operator trees 234, 235, etc. for possible execution. Query optimizer 222 may, for example transform relational operator tree 232 into a physical operator tree 234. Query optimizer 222 may transform the relational operator tree 232 by using a number of tree transformation rules to produce a number of physical operator trees, 234, 235, etc., which typically are logicall)-equivalent, but may not take the same time to execute. Query optimizer 222 may use a cost-based approach to select one of a number of logically-equivalent physical operator trees 234, 235, etc. to execute. For example, query optimizer 222 may select exemplary physical operator tree 234 to execute because the estimated execution cost of physical operator tree 234 is the least of the logically-equivalent physical operator trees generated. It will be understood that a number of factors may influence the selection of a physical operator tree to execute including for example, constraints such as number of processors, and the invention as contemplated includes within its scope any suitable selection criteria.

In one embodiment of the invention, query executor 224 receives optimized tree 234 and produces from it a transformed optimized read-only tree 236, that may be shared among multiple instances of the same query. Another type of transformed optimized tree which is not shared by users may also be generated, e.g., tree 238. A separate tree 238 may exist for each user even if all the users are executing the same query.

In one embodiment of the invention, plan creator 226 receives a shared tree such as exemplary tree 236 and produces from it a hierarchical plain-text compile-time execution plan 240, such as exemplary compile-time execution plan 300 in FIGS. 3a–c. In one embodiment of the invention the information returned is a single document or set of documents with the text of the statement, followed by different elements, attributes and their values with the details of the executions steps. The document or set of documents may show the estimated costs, number of rows returned or estimated to be returned, accessed indexes, type of operations performed, join order and additional information about the execution plan. Options may include one or more of: displaying the plan tree of the query plan being executed, displaying the query plan with full compile-time details (e.g., costing estimates and column lists) of the query being executed, displaying the query plan with full run-time details, including, for example, the actual number of rows passing through each operation of the query which was executed and displaying the query plan tree of the query being executed. In one embodiment of the invention, a compiltime execution plan such as compile-time execution plan 300 is an XML encoding of a shared tree. Exemplary compile-time execution plan 300 is an execution plan for the query SELECT count(*) FROM dbo.lineitem.

A compile-time execution plan may include information that is available without actually executing the query. Information such as the text of the query 304 is identified by a tag such as "StatementText" 302. Information included in the compiltime execution plan includes information concerning one or more relational operation nodes such as RelOp NodeId="0" 306, RelOp NodeId="1" 308, RelOp NodeId="2" 310, RelOp NodeId="3"312, RelOp NodeId="4" 314, RelOp NodeId="5" 316, each data item identified by a tag, such as exemplary tag "RelOp" 318. Additional information, such as for example, information provided by the query optimizer, may be included in the compile-time plan. Information provided by the query optimizer included in the compile-time plan may include but is not limited to, such information as scalar expressions, parameter values used to optimize a query, physical operator-specific information and cached plan size, how much memory the compiled plan will occupy in the cache. Exemplary scalar information is illustrated in blocks FIG. 3a block 320, FIG. 4a block 420 and FIG. 4b blocks 421 and 422. Exemplary parameter information is displayed in FIG. 3d, block 351. Exemplary physical operator-specific information is illustrated in FIG. 3a, block 306, 308, 310, FIG. 4a, block 450, etc. Exemplary cached plan size information is illustrated in FIG. 3a, block 352. It will be understood that although exemplary information for parameter information and cache plan size information is illustrated in a compile-time execution plan, similar features may also be found in run-time execution plans.

In one embodiment of the invention, plan creator 226 receives an optimized unshared tree such as exemplary tree 238 and produces from it a runtime execution plan 242, such as exemplary run-time execution plan 400 in FIGS. 4a–d. Alternatively, plan creator 226 may receive an unshared tree 238 and extract from it run-time information 241 which is merged into the compile-time plan 240 to produce a run-time execution plan 242. In one embodiment of the invention, a run-time execution plan such as run-time execution plan 400 is an XML encoding of an unshared tree. Exemplary run-time execution plan 400 is an execution plan for the query SELECT count(*) FROM dbo.lineitem.

In addition to the information included in the compile-time execution plan, a run-time execution plan may include additional information, such as that indicated by reference numerals 402, 404, 406, 408, 410 and 412. The additional information may include the number of rows processed 414 and the number of operator executions for each physical operator 416. (The total of Actual Rebinds and Actual Rewinds comprises the number of operator executions.) If these values differ significantly from their compile-time (estimated) counterparts, the query plan may not produce optimal performance. Run-time execution plans may also include additional information such as degree of parallelism 461.

An XML schema for exemplary compile-time and run-time plans 300 and 400 is provided on CD-ROM in a file named PKG23.XSD.TXT. Portions of this XML schema 500 are also illustrated in FIG. 5a–h. XML schema 500 includes a number of rules within it. For example, in one embodiment of the invention, queries can be one of four types "StmtSimpleType" 504 (a simple statement), "StmtCond-Type" 506 (a conditional statement), StmtCursorType 508 (a cursor statement), and "StmtReceiveType 510 (a receive statement). XML schema 500 in one embodiment of the invention, may describe information associated with various physical operators collected during compilation (e.g., estimated information), and other information such as memory grant, as defined in XML schema 500, block 520 and cached plan size, block 522. Memory grant shows the amount of memory granted for the query to run. Cached plan size show how much memory the compiled plan consumes. Together memory grant and cached plan size show how much memory the query requires. XML schema 500 in one embodiment of the invention, also describes one or more of the following: EstimateCPU 580, EstimateIO 581, EstimateRebinds 582, EstimateRewinds 583, Hash Type 585, relevant for hash joins, a list of logical operators, LogicalOpType 586, and a list of physical operators corresponding to the logical operators, PhysicalOpType, 587.

Figure 6:
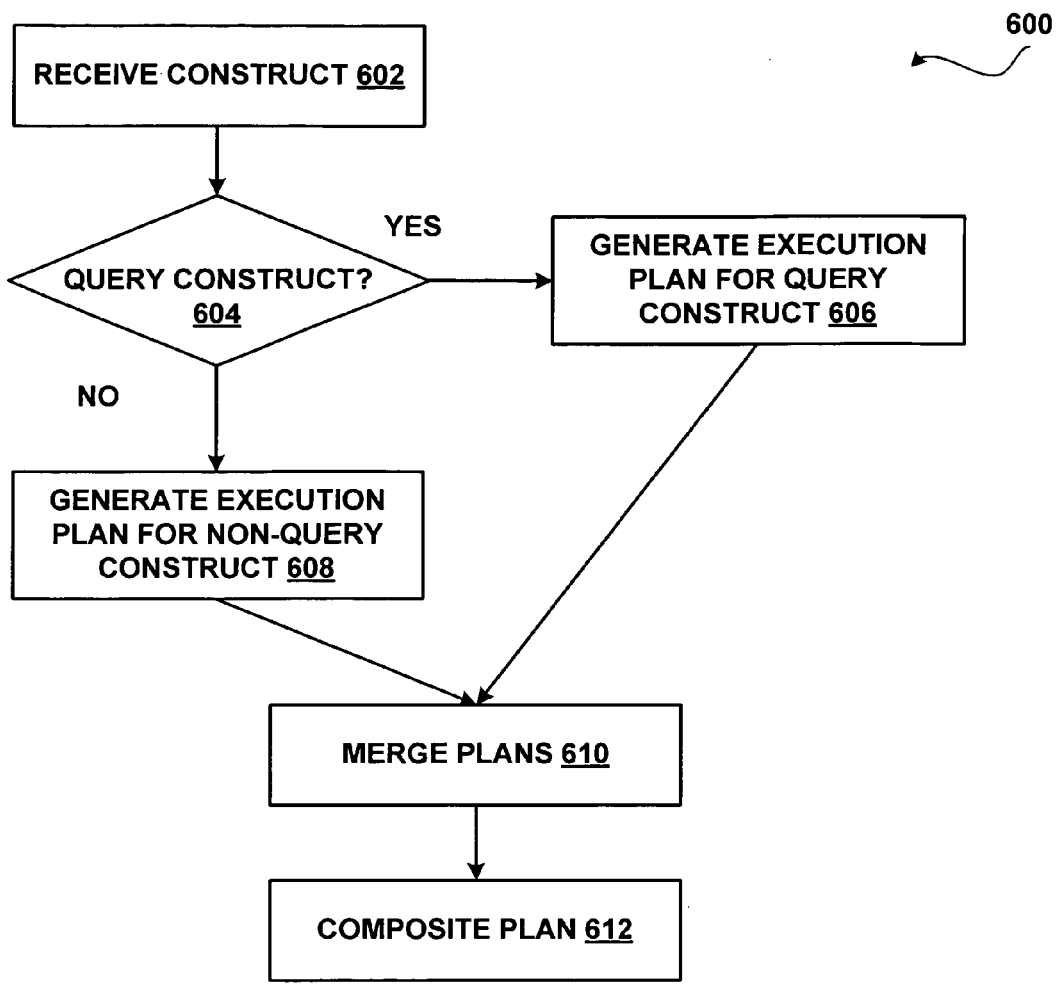
FIG. 6 is a flow diagram of a method for generating a plain-text hierarchical execution plan in accordance with one embodiment of the invention.

FIG. 6 is a flow diagram of a method 600 of generating a plain-text hierarchical execution plan in accordance with one embodiment of the invention. Query languages typically include query language constructs that manipulate the data in the database on a record level (e.g., SELECT, INSERT, UPDATE, DELETE, etc.) but also include control-flow structures (non query language constructs) such as IF, WHILE, variable declarations, assignment statements and so on. At step 602 a query, batch or stored procedure is received. At step 604 the non-query constructs are separated from the query constructs by parsing the input for syntactic characteristics. At step 606, an execution plan is generated for query constructs. As described above, a query optimizer chooses between many alternatives to select a plan which the optimizer determines to be optimal. At step 608 an execution plan is generated for non-query constructs. Non-query constructs do not provide the scope of alternatives available for query constructs. In fact, typically the ratio between non-query construct and query plan is 1:1. At step 610 the execution plan for the non-query construct and the execution plan for the query constructs are merged. The syntax of the query, batch, or stored procedure received at step 602 determines how the various plans are merged together. At step 612 a composite execution plan is generated.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machinereadable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the present invention has been described in connection with the preferred embodiments of the various figures, it is to be understood that other similar embodiments may be used or modifications and additions may be made to the described embodiments for performing the same function of the present invention without deviating therefrom. Similarly it will be understood that although the test framework is described within the context of an automated way of testing software, the invention is not so limited and may be used wherever the scheduling of processes within a standardized format is useful, as for example in the context of business processes. Therefore, the present invention should not be limited to any single embodiment, but rather should be construed in breadth and scope in accordance with the appended claims.

What is claimed is:

1. A system for generating a hierarchical plain-text execution plan comprising:
    an execution plan creator, the execution plan creator receiving a physical operator tree representing a plan to execute a query and generating from the physical operator tree a hierarchical plain-text execution plan from a compiled query plan to create a compile-time execution plan and updating the compile-time execution plan with execution information available when the compile-time execution plan is executed to create and store an execution-time execution plan.

2. The system of claim 1, wherein the hierarchical plain-text execution plan is an XML document.

3. The system of claim 2, wherein the XML document adheres to a specified XML schema.

4. The system of claim 1, wherein the physical operator tree is modified to create a transformed physical operator tree associated with a query, the transformed physical operator tree shared by a plurality of instances of the query.

5. The system of claim 4, wherein the transformed physical operator tree is read-only.

6. The system of claim 1, wherein the physical operator tree is modified to create a transformed physical operator tree associated with a particular instance of a query.

7. The system of claim 1, wherein the execution plan creator generates a first physical operator tree and a second physical operator tree, the first physical operator tree associated with the query and the second physical operator tree associated with a particular instance of the query.

8. The system of claim 1, further comprising a query parser, wherein the query parser receives a database query, parses the database query for correct syntax and builds a relational operator tree representing the database query.

9. The system of claim 8, wherein the database query is a SQL query.

10. The system of claim 1, further comprising a query optimizer that generates at least one physical operator tree from the relational operator tree representing the database query.

11. The system of claim 10, wherein the query optimizer transforms the relational operator tree into a plurality of physical operator trees using a plurality of tree transformation rules.

12. The system of claim 11, wherein the plurality of physical operator trees are logically equivalent.

13. The system of claim 12, wherein the query optimizer selects a one of the plurality of physical operator trees to execute.

14. The system of claim 13, wherein the query optimizer selects the one of the plurality of physical operator trees to execute based on an estimated cost of execution.

15. The system of claim 13, wherein the query executor executes the one of the plurality of physical operator trees to execute.

16. A method for generating a hierarchical plain-text execution plan for a query, the method comprising:

in response to receiving a database query, separating the database query into non-query language constructs and language constructs;

generating from the non-query language constructs a first hierarchical plain-text execution plan;

generating from the query language constructs a second hierarchical plain-text execution plan;

merging the first and second hierarchical plain-text execution plan into a composite compile-time execution plan;

updating the composite compile-time execution plan with information available when the composite compile-time execution plan is executed to create and store an execution-time execution plan.

17. The method of claim 16, wherein the composite execution plan is an XML document.

18. The method of claim 17, wherein the XML document conforms to an XML schema comprising the following elements: EstimateCPU, EstimateIO, EstimateRebinds, EstimateRewinds, and Estimate Rows.

19. A tangible computer-readable medium including computer-readable instructions for:

in response to receiving a database query, separating the database query into non-query language constructs and language constructs and generating from the non-query language constructs a first compile-time hierarchical plain-text execution plan and generating from the query language constructs a second compile-time hierarchical plain-text execution plan;

merging the first and second plans together to create a composite compile-time execution plan; and updating the composite compile-time execution plan with information available when the composite compile-time execution plan is executed to create and store an execution-time execution plan.

* * * * *